Oct. 17, 1933.  W. C. SCHEU  1,930,863
ORCHARD HEATER
Filed Aug. 5, 1929  2 Sheets-Sheet 1
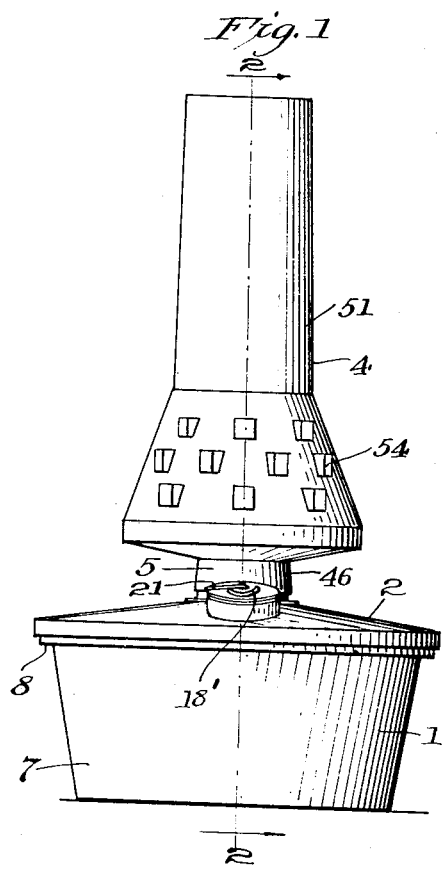
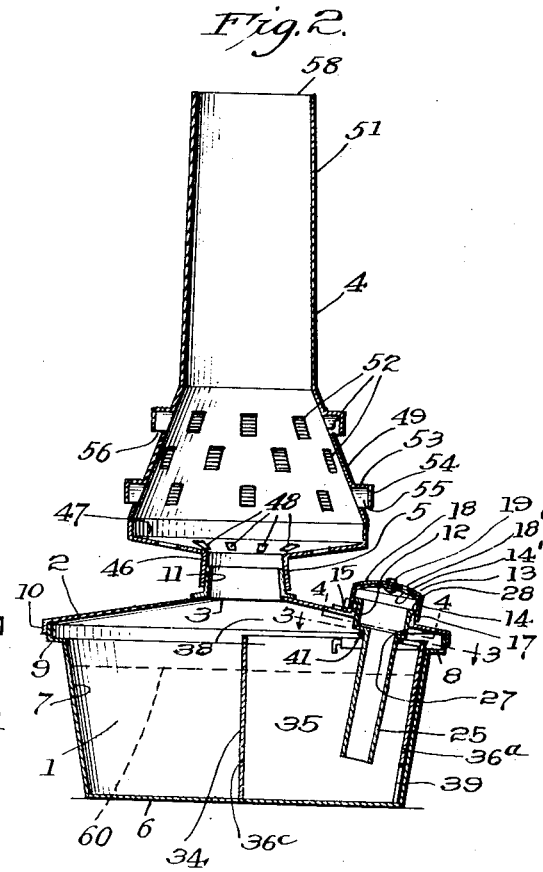
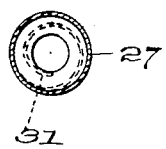
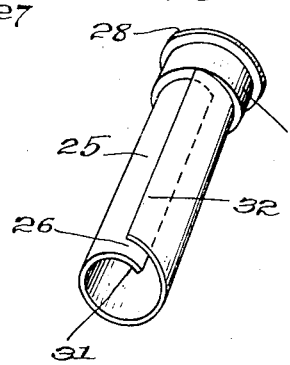
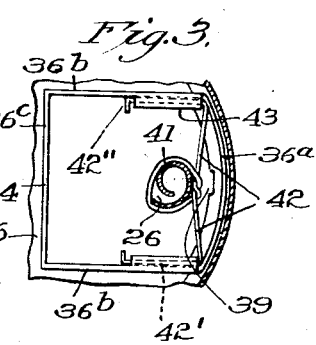
INVENTOR.
William C. Scheu,
BY Arthur P. Knight and
Alfred W. Knight
ATTORNEYS Oct. 17, 1933.    W. C. SCHEU    1,930,863
ORCHARD HEATER
Filed Aug. 5, 1929    2 Sheets-Sheet 2
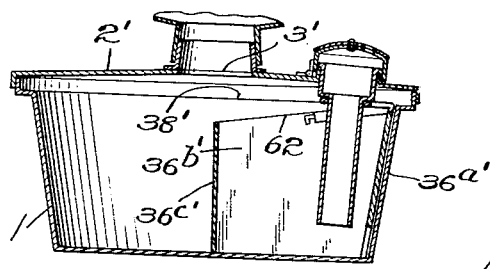
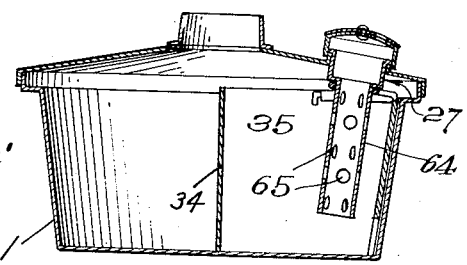
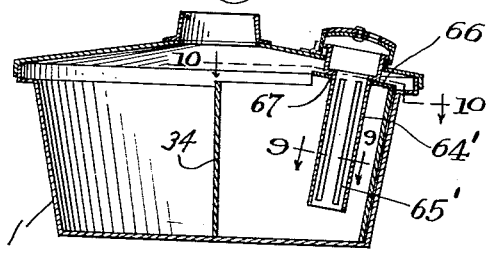
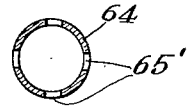
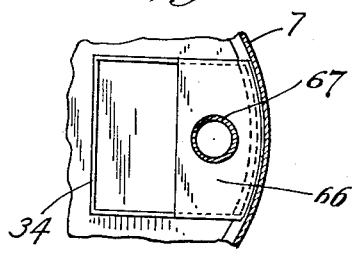
INVENTOR.
William C. Scheu,
BY Arthur P. Knight and
Alfred W. Knight
ATTORNEYS Patented Oct. 17, 1933

1,930,863

UNITED STATES PATENT OFFICE 1,930,863

ORCHARD HEATER

William C. Scheu, Upland, Calif., assignor to Scheu Products Company, Ltd., Upland, Calif., a corporation of California Application August 5, 1929. Serial No. 383,717

6 Claims. (Cl. 158—91)

This invention relates to orchard heaters and particularly to orchard heaters adapted to burn liquid fuel.

The invention pertains not only to a complete orchard heater having certain novel and advantageous features of construction, but also to a novel and advantageous partition device adapted to be mounted within the fuel receptacle of an existing orchard heater, for the purpose of improving the operation thereof.

The principal object of the invention is to provide for more complete and uniform generation of vapors from a body of liquid fuel contained in the fuel receptacle of an orchard heater, thus permitting complete and efficient utilization of such fuel.

An important object of the invention is to provide an orchard heater having novel and advantageous means for promoting generation of vapors from the liquid fuel. A further object of the invention is to provide a partition device of improved construction adapted to be mounted within the fuel receptacle of an existing orchard heater and to be positioned adjacent the air admitting means thereof so as to define a vapor generating chamber separated by the walls of said partition means from the remainder of the fuel receptacle, and within which a small flame may be maintained for generation of vapors from the fuel within said chamber. I have found that the application of such parition means to an orchard heater which previously had no such partition means serving to define a separate vaporizing chamber, greatly improves the operation of such heater and particularly produces more uniform and complete vaporization and utilization of the fuel therein. Furthermore, it practically prevents production of carbon or soot within the vaporizing chamber and fuel receptacle, so that the necessity for frequent removal of soot or carbon is eliminated or greatly reduced.

A further object of the invention is to provide, in connection with means such as above described for maintaining a uniform generation of vapors in a portion of the fuel receptacle, means for conducting such vapors upwardly into the stack to furnish a supply of vaporized fuel for the main combustion operation, which takes place inside the stack. This main combustion operation is also practically free from production of smoke or soot, so that the entire operation of the heater is clean, producing the maximum amount of heat from the entire body of fuel placed in the receptacle and leading to little if any production of smoke or smudge in the vicinity.

A particular object of this invention is to provide partition means having positioning means adapted to engage the air admitting means of an orchard heater so as to properly position the same within the fuel receptacle and beneath and around said air admitting means.

A further object of the invention is to provide a generating chamber of such a character that the generating flame can be maintained therein uniformly over a long period of time and in spite of gradual lowering of the fuel level due to consumption of the fuel, without requiring readjustment of the size of the exposed opening through which air is admitted to support said generating flame.

A further object of the invention is to provide an improved form of air admitting means for orchard heaters, for use either in conjunction with or without my improved form of partition means.

A further object of the invention is to provide an orchard heater stack having improved means for admitting air thereto at points distributed around the periphery thereof and at a plurality of different levels, while excluding direct access of rain or wind to the interior of the stack.

The complete orchard heater of the present invention comprises, in general, a fuel receptacle having a substantially tight fitting cover provided with air inlet means and with means extending downwardly therefrom for admitting a regulated quantity of air and for conducting the same downwardly into the receptacle, and with an outlet opening somewhat removed from said air admitting means. The outlet opening is preferably located substantially at the center of the cover, while the air admitting means are preferably located at one side of the center and adjacent the edge of the cover, so that the air delivered therethrough enters the fuel receptacle at a point adjacent one side thereof. The heater further comprises partition means extending upwardly from the bottom of the fuel receptacle and defining an enclosed vaporizing chamber located at one side of the fuel receptacle and surrounding the means for conducting air downwardly therein. Said partition means preferably extends upwardly somewhat above the maximum fuel level in the receptacle and the upper edge is so disposed relative to the cover as to permit outflow of vapors generated therein beneath the cover to said outlet opening. Said partition means is substantially imperforate, but a suitable opening is provided adjacent the bottom thereof for inflow of fuel from the remainder of the fuel receptacle into said vaporizing chamber regardless of the fuel level in the receptacle. The partition means is also provided with positioning means adapted to engage the air admitting means extending downwardly from the cover so as to insure proper positioning of said partition means in the fuel receptacle and around said air admitting means. The partiton means is preferably of such size that the vaporizing chamber enclosed thereby extends partially between the outlet opening leading to the stack.

The means for conducting air downwardly into the generating chamber preferably comprises a tubular member whose horizontal cross section is in the form of a short spiral of somewhat more than one complete turn so as to provide an elongated opening between the overlapping inner and outer edges thereof extending substantially from top to bottom of said member.

The heater further includes a stack removably mounted on the cover with its lower end in communication with the outlet opening in said cover and provided with means for admission of air therethrough and exclusion of rain and wind therefrom. For this purpose I prefer to use a stack having a frusto-conical portion provided with a plurality of rows of openings formed at different levels in the side wall thereof, and having the portion of the wall adjacent each of said openings extending horizontally outwardly from the upper edge of the opening and then vertically downwardly in front of the opening so as to protect said opening from entrance of rain or wind, the lower edge of said protecting portion being spaced outwardly from the lower edge of the opening so as to permit entrance of air therethrough.

The invention also includes the partition means itself, similar to the partition means above described, and adapted to be mounted in similar position in the fuel receptacle of an existing orchard heater having air admitting means, either of the type above described or of any other suitable type, for conducting air downwardly into the fuel receptacle, said partition means having positioning means such as above described for engaging said air conducting means.

The accompanying drawings illustrate embodiments of my invention and referring thereto:

Fig. 1 is a side elevation of an orchard heater according to this invention.

Fig. 2 is a vertical section thereof on line 2—2 in Fig. 1.

Fig. 3 is a horizontal section on line 3—3 in Fig. 2.

Fig. 4 is a horizontal section on line 4—4 in Fig. 2.

Fig. 5 is a perspective view of the preferred form of member for conducting air downwardly within the generating chamber.

Figs. 6, 7 and 8 are views similar to the lower portion of Fig. 2, but showing modified forms of partition means, air conducting means, and positioning means.

Fig. 9 is a section on line 9—9 in Fig. 8.

Fig. 10 is a section on line 10—10 in Fig. 8.

The orchard heater shown in general in Figs. 1 and 2 comprises a fuel receptacle 1 provided with a substantially tight fitting cover 2 having a central opening 3 and a stack 4 whose restricted lower end 5 is removably secured to the cover around said outlet opening. The fuel receptacle is shown as comprising a bottom wall 6 and side walls 7, and is preferably of circular cross section, the side walls being advantageously sloped outwardly and upwardly in the shape of an inverted steep-sided frustum of a cone and preferably provided at their upper end with an outwardly off-set portion 8 and an upwardly extending rim 9. The cover 2 preferably slopes upwardly in the form of a relatively flat frustum of a cone, toward the central outlet opening 3, and is shown as provided with a depending flange 10 at its outer edge making a substantially tight fit with the rim 9 of the fuel receptacle but being preferably slidably removable therefrom. A short collar 11 is preferably secured to the cover around the opening 3 and extends upwardly around said opening, so as to provide a convenient means for mounting the stack on the cover in communication with said opening as hereinafter described.

Cover 2 is also provided with a substantially circular air inlet opening 12 and means such as indicated at 13 are provided for regulating the inflow of air therethrough. Said air inlet and regulating means are preferably located at a point somewhat removed from the central outlet opening 3 and adjacent the edge of the cover. The regulating means is shown as comprising a cap member 14 hingedly mounted at 15 on cover 2 so as to be adapted to be lowered into position around a flange 17 extending upwardly from the cover immediately around the opening 12 or to be raised away from said opening for the purpose of filling the receptacle with fuel or for inspection or for any other purpose, and a regulating plate 18 pivotally mounted at 19 on said cap member. Cap member 14 and regulating plate 18 are provided with opening means 14' and 18' respectively adapted to be moved into or out of register with one another so as to control the inflow of air therethrough. Plate 18 may be provided with a handle 21 for rotation thereof to give the desired regulation.

Air admitting means are also provided extending downwardly from the inlet opening 12, said air admitting means being preferably mounted on and depending from the cover 2. Said air admitting means, as shown in Figs. 2 to 5 inclusive, may advantageously comprise a tubular member 25 having an opening 26 extending substantially throughout the height thereof and a cup-shaped upper portion 27 fitting snugly within the opening 12 and having an outward flange or bead 28 at its upper end adapted to rest on the flange 17 on cover 2 to support said air admitting means. The tubular member 25 is preferably formed in the shape of a short spiral in horizontal cross section, making somewhat more than one complete turn, so that the opening 26 is provided between the overlapping inner edge 31 and outer edge 32. Said opening may be directed toward the center of the heater, as shown, or in any other direction as may be desired. The tubular member 25 may be either open or closed at its lower end and may extend as shown down to a position near the bottom of the fuel receptacle.

Within the fuel receptacle and around and spaced on all sides from the air-admitting means there is mounted a substantially imperforate partition means 34 of suitable shape serving to enclose a generating chamber 35 around said air admitting means and to separate said generating chamber from the remainder of the fuel receptacle. Said partition means is shown as being generally rectangular in shape but may be advantageously provided at one side with a curved and sloping outer wall 36a conforming substantially in horizontal section to the curvature of the side wall 7 of the fuel receptacle so as to lie close to said side wall. The side walls 36b and inner wall 36c of partition means 34 may extend substantially vertically, as shown, and preferably extend up to or above the maximum fuel level within the receptacle 1. When the cover 2 is formed with a considerable upward slope toward the center, as shown for example in Fig. 2, the upper edges of the partition means may be substantially horizontal, as also shown in Fig. 2. The partition means also preferably extends inwardly to adjacent the center of the fuel receptacle, so that the generating chamber 35 lies partly beneath the outlet opening 3 leading to the stack. A space, indicated in general at 38 in Fig. 2, is thus provided between the upper edge of the partition means and the cover 2 through which the vapors generated in said generating chamber, together with the combustion products from the generating flame, may pass upwardly into the stack. The space 38 is understood to include not only the space above the inner wall 36c but also above the side walls 36b. The partition means 34 is also provided with opening means indicated at 39 for inflow of fuel thereto from the remainder of the fuel receptacle, said opening means being located at or adjacent the lower edge thereof and being preferably located in the outer wall 36a of said partition means. The location of such opening means at the point furthest removed from the outlet opening 3, and also the proximity of wall 36a to the side wall of the fuel receptacle, serve to substantially prevent outflow of fuel vapor from the generating chamber through said opening. The partition means is, therefore, adapted to permit outflow of vapors therefrom only between the upper edge thereof and the cover.

The means for positioning the partition means with respect to the air admitting means and also with respect to the fuel receptacle is shown as comprising a heavy wire or other rigid positioning member having an air admitting means engaging element, such as a loop portion 41, disposed at a position spaced from all of the walls of said partition means and embracing the upper portion of the air admitting tube 25, and two oppositely extending arms 42 connected to opposite sides of the partition means 34. For this purpose the outer portions of said arms may be bent inwardly as shown at 42' and secured to the side walls 36b of said partition means, as by bending or crimping a part of the metal at the top of said side walls over said portions 42' as shown at 43. The inner ends of portion 42' may be bent over as shown at 42'' to hold the same in the crimped portions 43. The arms 42 are preferably substantially equal in length so that the loop 41 and consequently the air admitting tube 25 is disposed substantially midway between the opposing side walls 36b of the partition means, but are so disposed relative to the inner and outer walls thereof as to bring the outer wall in close proximity to the side wall 7 of the receptacle when the loop 41 is in engagement with the air admitting tube.

The stack 4 is shown as comprising a neck portion 46 adapted to engage collar 11 so as to normally hold the stack in position of communication with the outlet opening 3 in the cover, said neck portion and collar being preferably tapered so as to permit the same to be brought into tight fitting engagement, but to also permit removal of the stack when desired. Above said neck portion the stack extends outwardly as shown at 47, said outwardly extending portion being preferably inclined upwardly somewhat toward its outer edge. The outwardly flaring portion 47 is preferably provided with a plurality of air inlet openings 48 which may be of any suitable shape and disposition. Said openings serve to admit air into the lower part of the stack but are well protected against access of rain or wind therethrough due to their location in the outward flaring portion 47.

From the outer edge of the outwardly extending portion 47, the stack is inclined upwardly and inwardly in the form of a frustum of a cone, shown at 49, while the upper portion 51 of the stack above said frusto-conical portion may be substantially cylindrical or may be a relatively steep sided frustum of a cone if desired. The frusto-conical portion 49 is provided with a plurality of air admitting openings 52, there being preferably a plurality of rows of such openings at different levels therein and a plurality of openings spaced about the wall in each row. The wall of this portion is also preferably formed so as to provide a protective shield over each of said openings, each of said shields including a portion 53 extending horizontally outward from the upper edge of the opening and a portion 54 extending downwardly from the outer edge of said horizontal portion. Each of said shields also preferably includes side portions 55 extending outwardly from the respective sides of the opening to the downwardly extending portion 54. The downwardly extending portion 54 has its lower edge spaced somewhat from the wall of the stack at the lower edge of the opening, so as to provide a space 56 through which the air may pass beneath said shield and through the opening 52, the portions 53, 54 and 55 of said shield serving, however, to prevent access of rain or wind to said opening. The above described protective shields may conveniently be formed by cutting a slit in the side wall of the stack at the position of the lower edge of each opening 52 and pressing the metal directly above said slit outwardly so as to form an opening 52 of the desired size and to also form the protective shield as above described. The upper end of the upper portion 51 of the stack is provided with an opening 58 for outflow of hot combustion products therefrom, it being understood that any suitable removable cover means may be provided for said opening when the stack is not in use so as to prevent access of rain therethrough.

In the operation of the above described heater the fuel receptacle 1, including the space inside and outside the partition means 34, is first filled with oil or other liquid fuel up to the desired level, for example some such level as indicated by the dotted line at 60 in Fig. 2. Such fuel may be poured in through the air admitting means 27 and 25, the cap member 14 being swung upwardly about its hinge 15 to permit access to said air admitting means for this purpose. The fuel may then be ignited in any suitable manner as, for example, by pouring a little gasoline or other readily inflammable liquid thereon and igniting such inflammable liquid, and the cap member 14 may then be lowered to position around the flange 17. Regulating plate 18 is so adjusted about its pivot 19 as to expose the desired area of openings 14' and 18' for admitting the proper amount of air during the initial period of the operation. The air thus admitted serves to maintain a small generating flame within the generating chamber 35, said generating flame being located adjacent the point where air passes from the opening 26 in the air admitting means into the generating chamber. The vapors generated by the heat of this generating flame pass upwardly and through the space 38 between the cover and the upper edge of partition means 34 and thence through opening 3 into the stack. Combustion of these vapors in the stack may also be started by introducing a small amount of gasoline or other readily inflammable liquid into the interior of the stack and igniting the same. The vapor entering the stack will thereupon be also ignited and will burn in the presence of air admitted through the openings 48 and 52. As soon as the vaporizing chamber and the fuel therein become heated sufficiently to cause a continual generation of vapors from such fuel, these vapors will furnish the fuel for the generating flame, a certain proportion of such vapors burning in the presence of air admitted through opening 26. After the operation is well started, it is generally desirable to re-adjust the regulating plate 18 so as to decrease the exposed area of openings 14' and 18' and admit just enough air to produce a generating flame of the desired intensity and volume. Said generating flame serves to heat the oil in the vaporizing chamber not only by direct impingement of the hot flame or combustion products on the surface of the oil and by radiation from the flame to the oil, but also by heat conducted to the oil through the heated walls of the vaporizing chamber. After this first re-adjustment, very little or no change in regulation is required, and I have found that it is possible to obtain substantially complete vaporization and combustion of all of the fuel within the receptacle without any further re-adjustment of the air admitting openings.

In the normal operation of the heater, the air enters through the openings 14' and 18', passes downwardly in the tubular air admitting means 25 and out through the openings 26 into the generating chamber, in which a small generating flame is maintained, sufficient to heat the oil in said generating chamber and cause formation of fuel vapors which pass upwardly from the vaporizing chamber to the stack as above described. I have found that in connection with an orchard heater having air admitting means extending downwardly from the cover thereof for conducting the air downwardly and delivering the same in proximity to the surface of the oil, the provision of partition means such as those above described, surrounding said air admitting means and adapted to permit outflow of vapors from only the upper end thereof, is particularly advantageous in confining the generating flame to its proper position adjacent the air admitting means and preventing such flame from jumping upwardly into the stack as sometimes occurs when no such partition means are provided, and in also maintaining a generating flame of uniform size and intensity throughout the operation of the heater. Said partition means is also effective in maintaining the generating flame in spite of lowering of the fuel level in the generating chamber, so that the generation of vapors is continued uniformly until the entire amount of fuel in the receptacle is substantially completely consumed. It will be understood that the vaporization of the fuel is not confined wholly to the vaporizing chamber, as the oil in the portion of the receptacle outside the vaporizing chamber will also generally become heated to a sufficient temperature to cause vaporization thereof, due not only to heat conducted thereto through the partition means and the walls of the fuel receptacle, but also to heat received from the hot vapors and products of combustion in their passage through the upper portion of the fuel receptacle, from the vaporizing chamber to the stack.

The provision of positioning means for definitely determining the position of the partition means relative to the air admitting means and to the fuel receptacle, is also highly advantageous, in that it insures equal spacing of the air admitting means between the two side walls 36b of the generating chamber and thus tends to provide equal distribution of the passage of generated vapors over the inner wall 36c and said side walls. It also insures that the inner wall 36c of the partition means will always be properly positioned relative to the outlet opening 3 leading to the stack, and that the outer wall 36a of said partition means will always be in close proximity to the side wall of the fuel receptacle.

The vapors generated as above described and continually delivered to the stack through opening 3 are burned in the presence of air admitted through openings 48 and 52, so that the main combustion operation which produces the major portion of the heat utilized for heating the space surrounding the heater takes place within the interior of the stack and in some cases partly above the outlet thereof.

As the generation of vapors from the liquid fuel necessarily occurs at a more rapid rate within the generating chamber than outside the partition means, it is necessary to provide for continual flow of fuel through said partition means into the generating chamber. Such flow of fuel occurs in the present construction between the outer wall 36 of the partition means and the side wall 7 of the fuel receptacle, and through the opening 39. The location of said opening at or adjacent the bottom of the wall 36 prevents any escape of vapor therethrough until the fuel level falls below the top of said opening, and even when this low fuel level is reached, the location of said opening at the part of the partition means furthest removed from the opening into the stack and the restricted space between the partition means and the side wall of the fuel receptacle prevents any appreciable escape of vapors therethrough, so that throughout the operation the outflow of vapors from the generating chamber takes place substantially wholly over the upper edge of the partition means.

In Fig. 6 I have shown a somewhat modified construction, in which the cover 2' is substantially horizontal or has only a slight upward slope toward the center. In such cases it may be necessary or desirable to make the inner wall 36c' of the partition means of somewhat less height than the outer wall 36a' and to slope the upper edges of the side walls 36b' downwardly from the outer wall toward the inner wall as shown at 62, in order to provide the desired space 38' for passage of vapors from the generating chamber to the outlet opening 3' leading to the stack. Except for the differences above mentioned, the construction may in this case be substantially the same as above described.

The construction shown in Fig. 7 is substantially the same as shown in Fig. 2, except for the provision of a different form of air admitting means. Said air admitting means is shown in this case as comprising a cylindrical tube 64 extending downwardly from the cup-shaped member 27 which may be supported as before in the air inlet opening in the cover. The tube 64 is provided with perforations 65 distributed throughout the height thereof in any suitable arrangement, said perforations serving to deliver the air to the generating chamber 35 for supporting combustion therein in the same manner as the opening 26 in the form of air admitting means first described.

In the construction shown in Figs. 8 to 10 inclusive, the air admitting means is similar to that shown in Fig. 7 with the exception that the tube 64' is in this case provided with vertically extending slots 65' extending substantially throughout the height thereof and distributed at any desired positions about the periphery of said tube. For positioning the partition means with respect to the air admitting means, I have in this case shown said partition means as provided with a top plate 66 secured to the upper edges of the side walls and outer wall thereof and extending over the top of the outer portion of the generating chamber, said top plate being provided with an opening 67 adapted to fit closely around the tube 64', and perform the same functions of positioning the partition means as performed by the positioning means first described. It will be understood, of course, that this form of positioning means may also be used in connection with any of the other forms of air admitting means above described, and also that the form of positioning means first described may be used in connection with the air admitting means shown in these figures.

It will be understood that the heaters as above described may be manufactured for sale and use as complete units, but the invention also contemplates the manufacture and sale of the partition means alone, with its positioning means, for use in conjunction with existing orchard heaters having air admitting means extending downwardly from the cover but having no such partition means. Such partition means may be made of such shape, and the positioning means therefor so disposed as to adapt it to any desired type of orchard heater such as those above described, or in general to any orchard heater having air admitting means such as above described or any other type of air admitting means extending downwardly from the cover, said positioning means being adapted in any case to maintain said partition means in position within the fuel receptacle and surrounding and spaced on all sides from the downwardly extending air admitting means.

I claim:

1. An orchard heater comprising a fuel receptacle having a substantially tight fitting cover, a stack mounted on said cover and communicating with the interior of said receptacle, air admitting means extending downwardly from said cover, said air admitting means being provided with opening means for receiving air from outside the receptacle and being adapted to deliver said air over the surface of the oil within the receptacle, partition means mounted within said receptacle and surrounding and spaced from said air admitting means, and positioning means on said partition means engaging said air admitting means so as to properly position said partition means with respect to said air admitting means.

2. An orchard heater as set forth in claim 1, said partition means having an outer wall in close proximity to the side wall of the fuel receptacle, two side walls substantially equi-distant from said air admitting means, and an inner wall extending beneath said stack, and said positioning means serving to hold said partition means with its walls in such positions.

3. A partition device for mounting in an orchard heater having a fuel receptacle, a cover, and air admitting means extending downwardly from said cover into the receptacle, said partition device comprising an inner wall, an outer wall, and two side walls cooperating to entirely enclose the sides of the space therebetween, and positioning means on said partition device adapted to engage the air admitting means of the heater and to position said partition device with the outer wall thereof adjacent the side-wall of the fuel receptacle and inner wall thereof near the center of the receptacle, said inner wall having its upper edge spaced somewhat below the cover to permit outflow of vapors over said upper edge.

4. An orchard heater comprising a fuel receptacle, a cover therefor provided with an inlet opening and an air admitting means mounted on said cover at said inlet opening and comprising a tubular member formed in horizontal section as a short spiral of somewhat more than one complete turn, the overlapping inner and outer edges of said spiral being spaced apart to provide an opening extending substantially throughout the height of said tubular member.

5. A partition device for mounting in an orchard heater, comprising upwardly extending walls entirely inclosing the sides of the space therebetween to define an inclosed generating chamber, and positioning means secured to said walls and extending across said space to a position spaced from all of said walls.

6. A partition device for mounting in the fuel receptacle of an orchard heater having an air admitting means extending downwardly into the fuel receptacle thereof, comprising upwardly extending walls entirely inclosing the sides of the space therebetween to define an inclosed generating chamber, and an air admitting means engaging element secured to said walls and extending across said space to a position spaced from all of said walls.

WILLIAM C. SCHEU.